(12) United States Patent
Alapati et al.

(10) Patent No.: US 8,255,604 B2
(45) Date of Patent: Aug. 28, 2012

(54) INTERRUPT VECTOR PIGGYBACKING

(75) Inventors: Sangram Alapati, Austin, TX (US); Nitin Gupta, Bangalore (IN); Brad Lee Herold, Austin, TX (US); Harish P. Omkar, Karnataka (IN); Alexandru Adrian Patrascu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/755,065

(22) Filed: Apr. 6, 2010

(65) Prior Publication Data

US 2011/0246696 A1 Oct. 6, 2011

(51) Int. Cl.
G06F 13/24 (2006.01)
G06F 13/32 (2006.01)
G06F 9/455 (2006.01)

(52) U.S. Cl. ........ 710/269; 710/260; 710/261; 710/266; 718/1

(58) Field of Classification Search .......... 710/260–269; 718/1
See application file for complete search history.

(56) References Cited

U.S. PATENT DOCUMENTS

| | | | | |
|---|---|---|---|---|
| 4,255,786 A * | 3/1981 | Holtey et al. | | 710/269 |
| 4,665,520 A | 5/1987 | Strom | | 714/15 |
| 4,768,149 A * | 8/1988 | Konopik et al. | | 710/47 |
| 5,410,709 A * | 4/1995 | Yu | | 710/269 |
| 5,796,939 A * | 8/1998 | Berc et al. | | 714/47.3 |
| 5,974,522 A | 10/1999 | Torng et al. | | 712/23 |
| 8,145,819 B2 * | 3/2012 | Alapati et al. | | 710/266 |
| 2003/0051087 A1* | 3/2003 | Corrigan et al. | | 710/260 |
| 2004/0117532 A1* | 6/2004 | Bennett et al. | | 710/260 |
| 2006/0064528 A1* | 3/2006 | Soltis et al. | | 710/260 |
| 2006/0101181 A1* | 5/2006 | Post et al. | | 710/266 |
| 2006/0161917 A1* | 7/2006 | Leung et al. | | 718/100 |
| 2008/0301402 A1 | 12/2008 | Alapati et al. | | 712/7 |
| 2011/0099431 A1* | 4/2011 | Almog et al. | | 714/45 |

OTHER PUBLICATIONS

Shriraman, A. et al., "An Integrated Hardware-Software Approach Flexible Transactional Memory," 2007.
Criswell, J. et al., "Secure Virtual Architecture: A Safe Execution Environment for Commodity Systems," 2007.

* cited by examiner

Primary Examiner — Thomas J Cleary
(74) Attorney, Agent, or Firm — Van Leeuwen & Van Leeuwen; Matthew B. Talpis (57) ABSTRACT

A hypervisor receives an interrupt that includes a target address and, in turn, branches to an administrating interrupt vector. Next, the administrating interrupt vector determines whether to branch to a piggyback interrupt handler corresponding to a piggyback interrupt vector. Based upon the determination, the hypervisor either branches to the piggyback interrupt handler or to an administrating interrupt handler that corresponds to the administrating interrupt vector.

21 Claims, 7 Drawing Sheets

INTERRUPT VECTOR PIGGYBACKING

BACKGROUND

Computer systems are becoming increasing complex and include multiple operating systems that execute concurrently. These computer systems may include a hypervisor, which is a program that allows multiple operating systems to share a single hardware host by creating an environment such that each operating system appears to have the host's processor, memory, and other resources all to itself. The hypervisor, however, actually controls the resources and allocates particular resources to each operating system as required. In addition, the hypervisor processes resources generated by the guest operating systems and, in turn, ensures that the guest operating systems do not disrupt each another.

SUMMARY

A hypervisor receives an interrupt that includes a target address and, in turn, branches to an administrating interrupt vector. Next, the administrating interrupt vector determines whether to branch to a piggyback interrupt handler corresponding to a piggyback interrupt vector. Based upon the determination, the hypervisor either branches to the piggyback interrupt handler or to an administrating interrupt handler that corresponds to the administrating interrupt vector.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

A system, method, and program product are disclosed that enables a hypervisor to utilize small, limited space vectors to process interrupts generated by an operating system or application. In one embodiment, the hypervisor may be in "real mode" processing, which requires the hypervisor's interrupt vectors to perform real mode handling tasks (e.g. saving register information, calculating a branch location, setting up switches, and etcetera). Since the limited space vectors may not be large enough to include code for completing all of the necessary real mode handling tasks, this disclosure describes limited space "piggyback interrupt vectors" that set a piggyback interrupt flag and branch to a larger "administrating interrupt vector" to further process the interrupt. As a result, a developer may create new piggyback interrupt vectors and corresponding piggyback interrupt handlers to process new interrupts for developed computer architectures.

Figure 1:
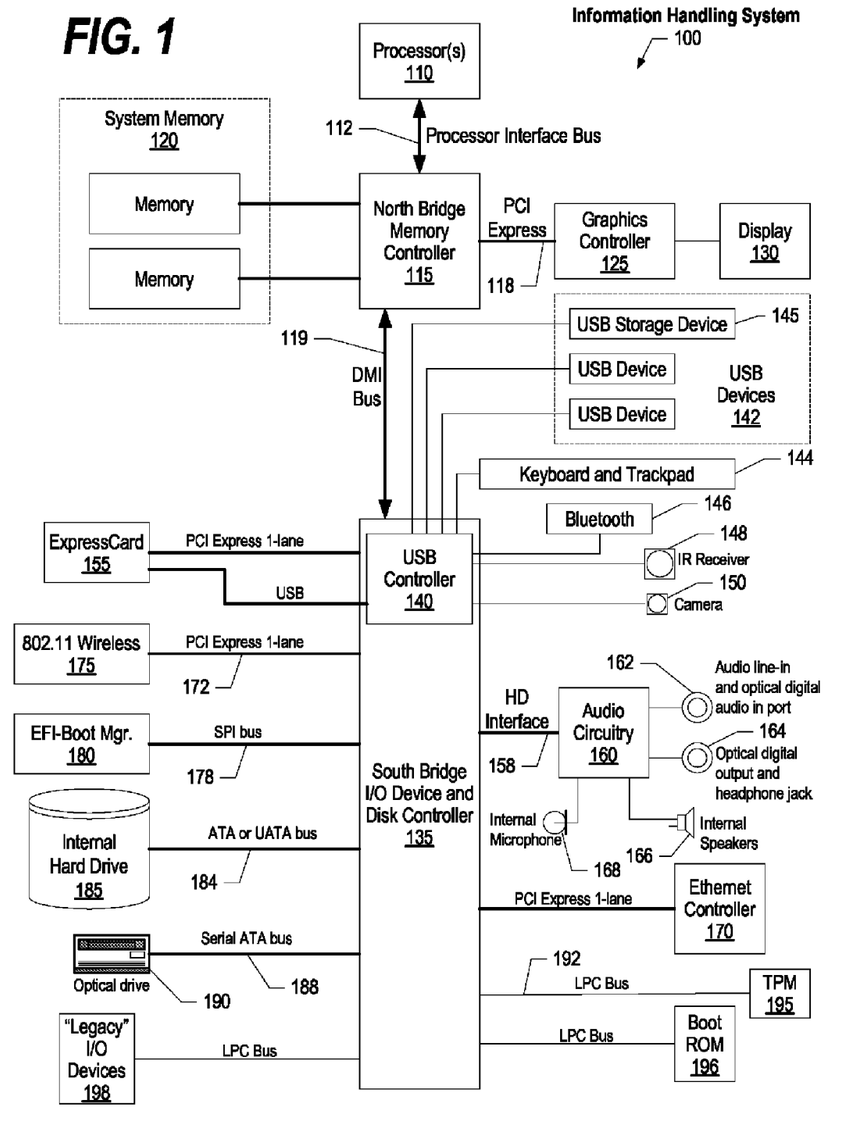
FIG. 1 is a block diagram example of a data processing system in which the methods described herein can be implemented.
Figure 2:
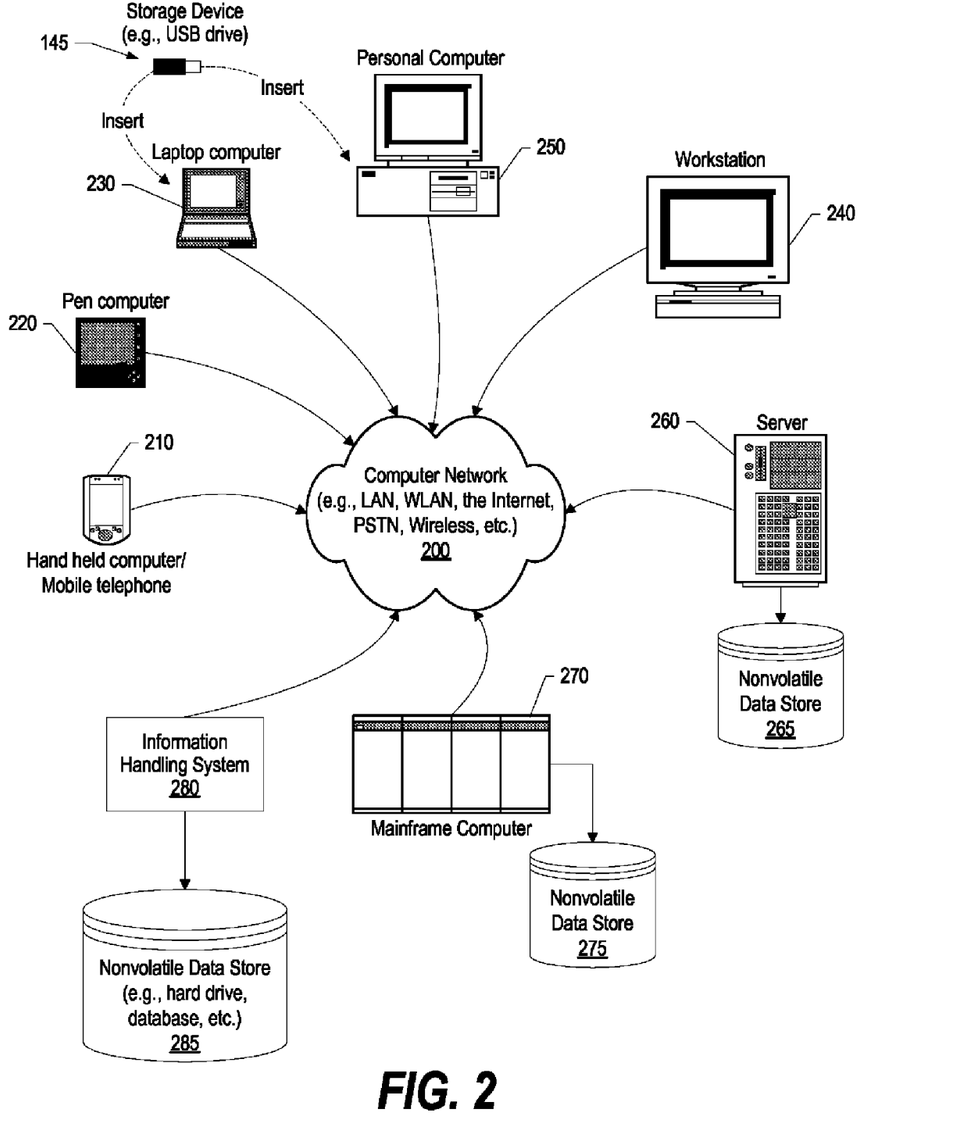
FIG. 2 provides an extension example of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
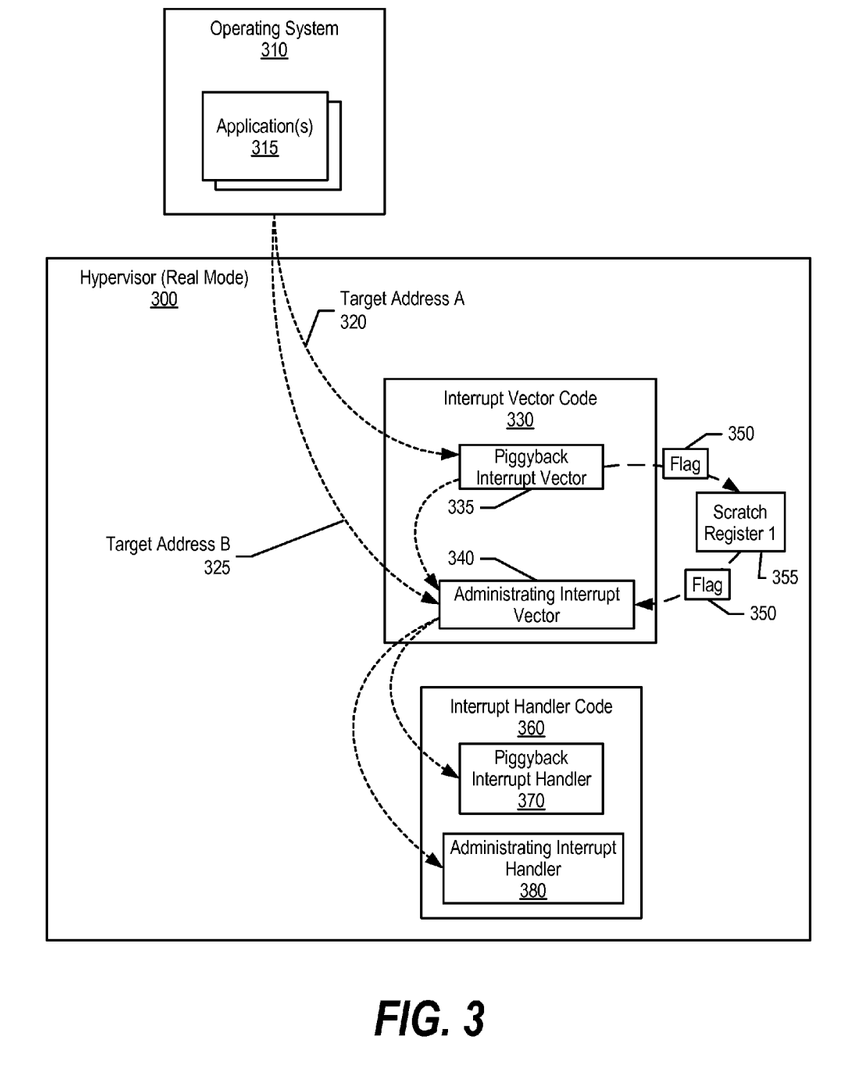
FIG. 3 is a diagram showing a hypervisor processing an interrupt that includes a target address.

FIG. 3 is a diagram showing a hypervisor processing an interrupt that includes a target address. Hypervisor 300 processes interrupts generated by operating system 310 and/or application(s) 315. In one embodiment, hypervisor 300 may be in "real mode" processing, which requires hypervisor 300's interrupt vectors to perform real mode handling tasks (e.g. saving register information, calculating a branch location, setting up switches, and etcetera). Hypervisor 300 uses limited space vectors (piggyback interrupt vector 335), which may not be large enough to include code for completing all of the necessary real mode handling tasks. As such, hypervisor 300's limited space vectors set a piggyback interrupt flag and branch to a larger "administrating interrupt vector" 340 to further process the interrupt. As a result, a developer may create new piggyback interrupt vectors and corresponding piggyback interrupt handlers to process new interrupts for developed computer architectures.

Hypervisor 300 includes interrupt vector code 330 and interrupt handler code 360. Interrupt vector code 330 includes interrupt vectors to process particular interrupts generated by operating system 310 or application(s) 315. FIG. 3 shows two interrupt vectors, which are piggyback interrupt vector 335 and administrating interrupt vector 340. Piggyback interrupt vector 335 is a limited space vector that is not large enough to perform all required tasks to process an interrupt. Limited space vectors may be a result of adding interrupts to an established architecture that specifies an address range to include interrupts (e.g., 000H-2000H). For example, an established architecture may include ten interrupts in the address range, and a developer may wish to add three more interrupts into the address range. As such, when operating system 310 or application(s) 315 generate an interrupt with target address A 320 (location of piggyback interrupt vector 335), piggyback interrupt vector 335 sets piggyback interrupt flag 350 in scratch register 1 355 and branches to administrating interrupt vector 340, which is a larger interrupt vector.

In turn, administrating interrupt vector 340 retrieves piggyback interrupt flag 350 from scratch register 355 to determine whether piggyback interrupt vector 335 called administrating interrupt vector 340, or whether administrating interrupt vector 340 was called directly by operating system 310/application(s) 315 via target address B 325, in which case no piggyback interrupt flag is set.

Based upon administrating interrupt vector 340's analysis of piggyback interrupt flag 350, administrating interrupt vector 340 branches to piggyback interrupt handler 370 (piggyback interrupt flag set) or administrating interrupt handler 380 (piggyback interrupt flag not set). In one embodiment, administrating interrupt vector 340 supports multiple piggyback interrupt vectors and corresponding piggyback interrupt handlers. In this embodiment, piggyback interrupt flag 350 indicates which piggyback interrupt vector called administrating interrupt vector 340 (e.g., piggyback interrupt flag "6"). In turn, administrating interrupt vector 340 branches to the corresponding piggyback interrupt handler (see FIG. 6 and corresponding text for further details).

Figure 4A:
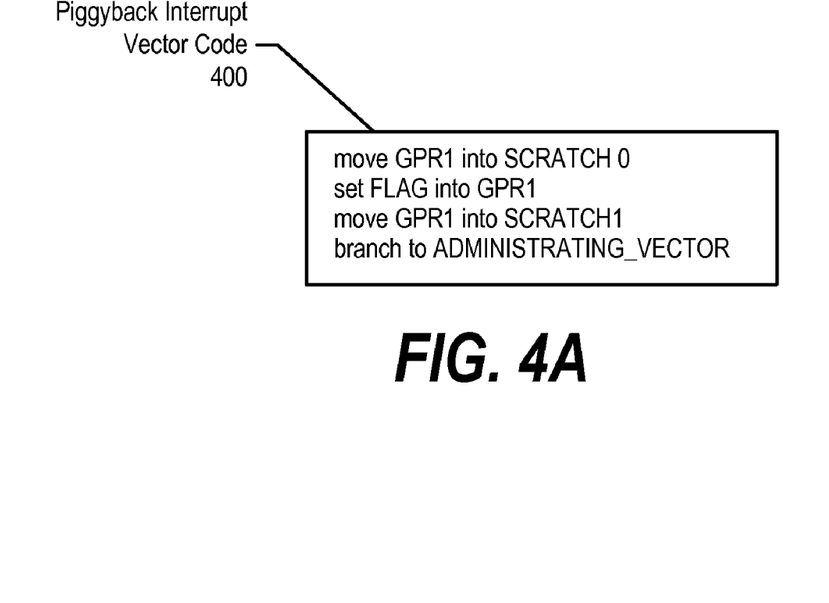
FIG. 4A is an embodiment showing piggyback interrupt vector code.

FIG. 4A is an embodiment showing piggyback interrupt vector code. Piggyback interrupt vector code 400 includes a limited number of lines to fit into a limited space vector, such as vector 420 shown in FIG. 4B. As those skilled in the art can appreciate, a larger or smaller vector size may be available as a piggyback interrupt vector based upon a computer system's architecture. The embodiment shown in FIG. 4A assumes that a piggyback interrupt vector does not store information directly into scratch registers. As such, the embodiment shows the piggyback interrupt vector storing flag information into a general purpose register and moving the flag information into a scratch register. For example, an established architecture may include ten interrupts in the address range, and a developer may wish to add three more interrupts into the address range. In this example, the new interrupts may be processed using piggyback vectors, which call an administering vector for further processing (see FIG. 6 and corresponding text for further details). As those skilled in the art can appreciate, other embodiments may be utilized to store flag information directly to the scratch registers based upon a computer system's architecture.

Figure 5A:
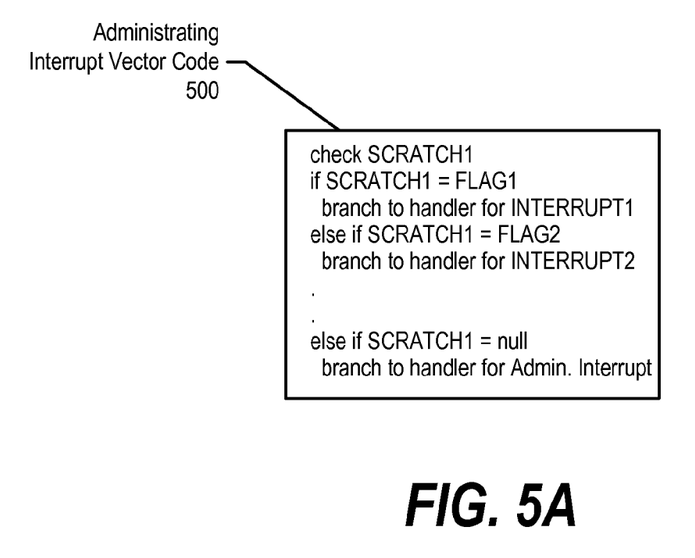
FIG. 5A is an embodiment showing administrating interrupt vector code.

Piggyback interrupt vector code 400 includes a move instruction that moves state information from a general purpose register to a scratch register. Next, the piggyback interrupt vector sets a piggyback interrupt flag into the general purpose register that identifies the piggyback interrupt vector (e.g., piggyback interrupt vector "5"). In turn, the piggyback interrupt vector moves the piggyback interrupt flag from the general purpose register to a different scratch register (scratch register 1), and branches to an administrating interrupt vector. As shown in FIG. 5A, the administrating interrupt vector checks the scratch register 1 to determine which, if any, piggyback interrupt vector called the administrating interrupt vector.

Figure 4B:
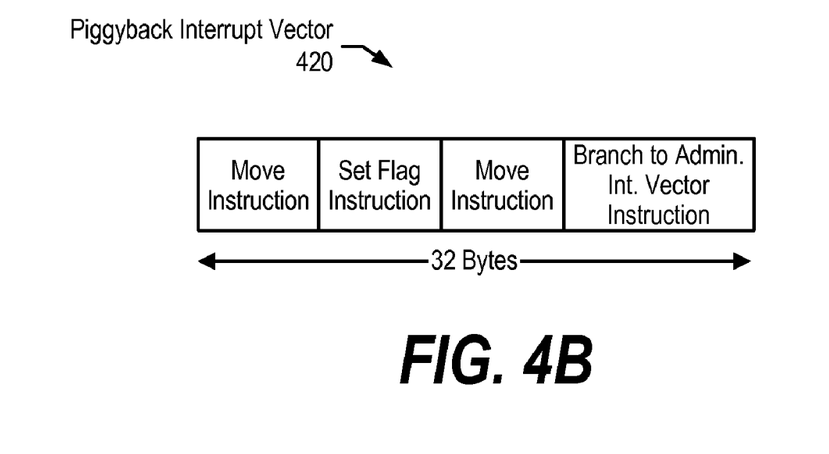
FIG. 4B is an embodiment showing a piggyback interrupt vector.

FIG. 4B is an embodiment showing a piggyback interrupt vector. Piggyback interrupt vector 420 shows an embodiment of a limited space interrupt vector. As can be seen, piggyback interrupt vector 420 includes instructions that correspond to piggyback interrupt vector code 400 shown in FIG. 4A. Although piggyback interrupt vector 420 shows a 32 byte vector, those skilled in the art can appreciate that piggyback interrupt vector 420 may be larger or smaller in size.

FIG. 5A is an embodiment showing administrating interrupt vector code. An administrating interrupt vector may be called by a piggyback interrupt vector, or may be called directly by an operating system/application. In situations when a piggyback interrupt vector calls the administrating interrupt vector, the piggyback interrupt vector first sets a piggyback interrupt flag to inform the administrating interrupt vector which piggyback interrupt vector called the administrating interrupt vector (see FIG. 4A and corresponding text for further details). As such, administrating interrupt vector code 500 checks whether the piggyback interrupt flag is set in the scratch register. If the scratch register includes a piggyback interrupt flag, the administrating interrupt vector branches to a corresponding piggyback interrupt handler. For example, if the piggyback interrupt flag is "6," the administrating interrupt vector branches to piggyback interrupt handler "6." However, if the scratch register does not include a piggyback interrupt flag (indicating a direct call from an operating system or application), the administrating interrupt vector branches to an administrating interrupt handler that corresponds to the administrating interrupt vector.

Figure 5B:
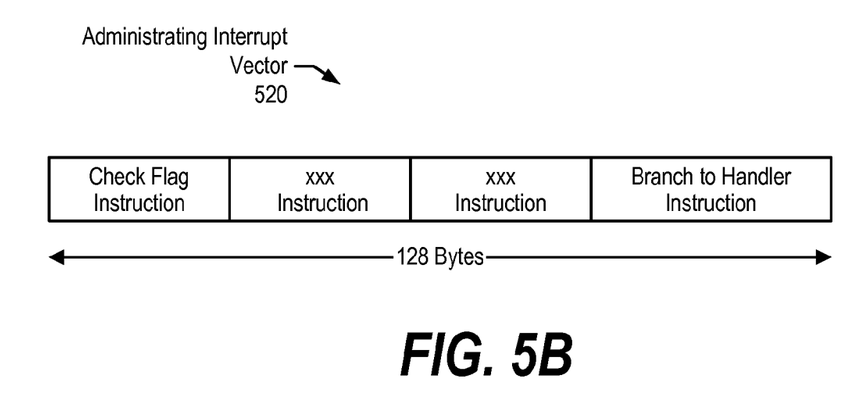
FIG. 5B is an embodiment showing a administrating interrupt vector.

FIG. 5B is an embodiment showing a administrating interrupt vector. Administrating interrupt vector 520 includes instructions that correspond to administrating interrupt vector code 500 shown in FIG. 5A. Although administrating interrupt vector 520 shows a 128 byte vector, those skilled in the art can appreciate that administrating interrupt vector 520 may be larger or smaller in size.

Figure 6:
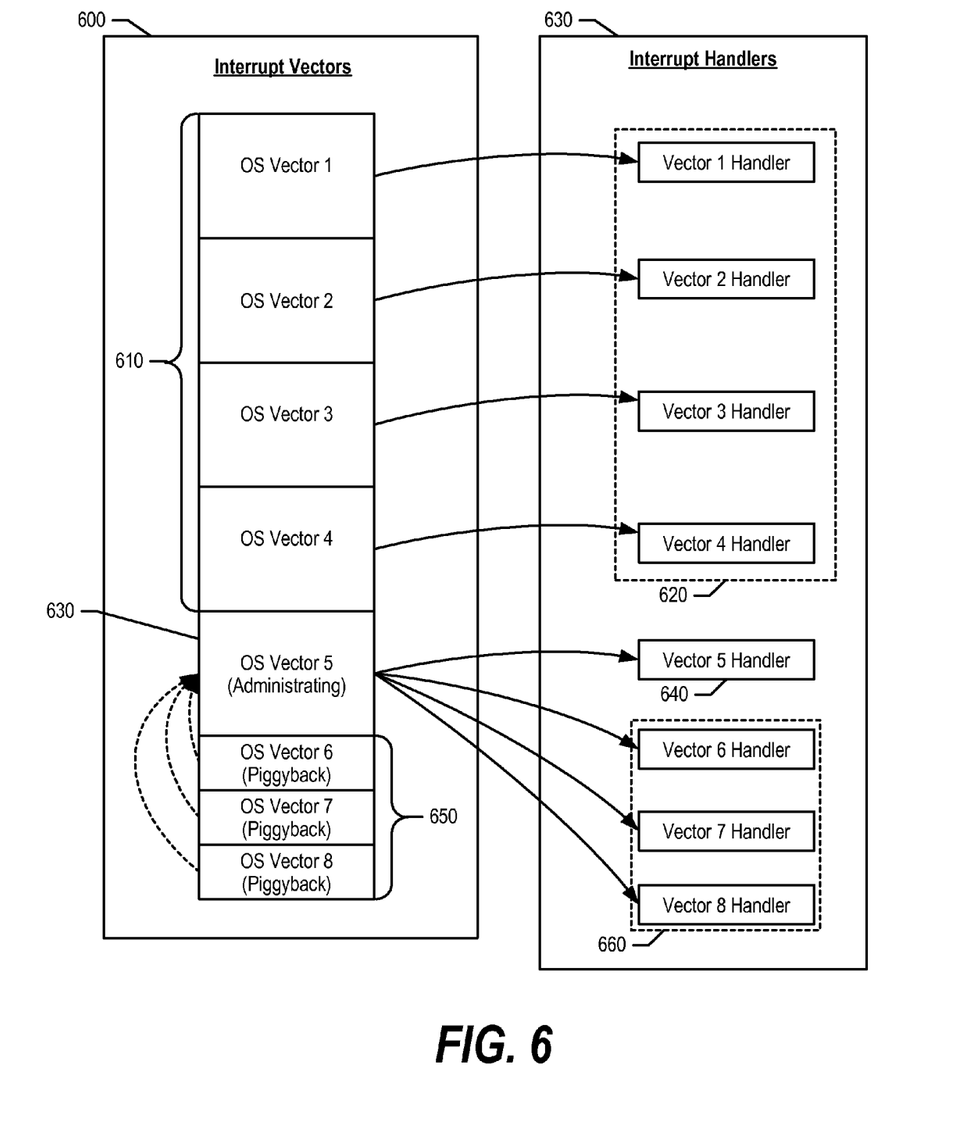
FIG. 6 is a diagram showing correlations between interrupt vectors and interrupt handlers.

FIG. 6 is a diagram showing correlations between interrupt vectors and interrupt handlers. FIG. 6 shows interrupt vectors 600 and interrupt handlers 630. Typically, a one-to-one correlation exists between interrupt vectors and interrupt handlers. However, as discussed previously, due to the fact that many interrupt vectors may not have enough bits to sufficiently handle an interrupt, these "piggyback" interrupt vectors depend upon an administrating interrupt vector to process the interrupt.

Interrupt vectors 600 include interrupt vectors 610, which are interrupt vectors that correspond directly to one of interrupt handlers 620. Administrating interrupt vector 630 correlates with administrating interrupt handler 640, and also supports piggyback interrupt vectors 650 by calling one of piggyback interrupt handlers 660. For example, if an application generates an interrupt whose target address is administrating interrupt vector 630, then administrating interrupt vector 630 detects that no piggyback interrupt flag is set and, in turn, calls administrating interrupt handler 640 to process the interrupt. In another example, when an application generates an interrupt whose target address is piggyback interrupt vector 7 (included in piggyback interrupt vectors 650), piggyback interrupt vector 7 sets the piggyback interrupt flag, which is subsequently detected by administrating interrupt vector 630. In turn, administrating interrupt vector 630 calls piggyback interrupt handler 7 (included in piggyback interrupt handlers 660) accordingly.

Figure 7:
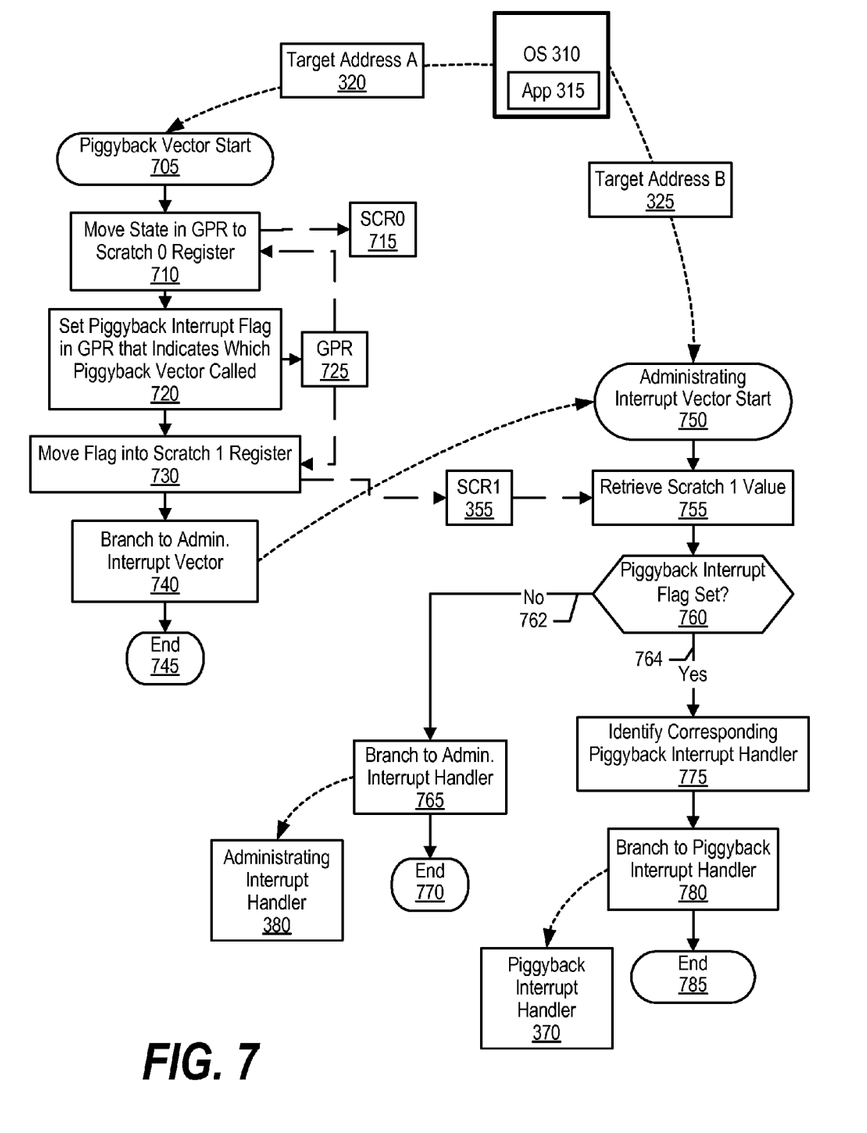
FIG. 7 is a flowchart showing a hypervisor processing an interrupt in real mode.

FIG. 7 is a flowchart showing a hypervisor processing an interrupt in real mode. Operating system 310 or application 315 generates an interrupt targeted for a particular address that a hypervisor processes. Some target addresses may correspond to a regular interrupt vector, such as one of interrupt vectors 610 shown in FIG. 6. Another target address may correspond to an administrating interrupt vector, such as administrating interrupt vector 630 shown in FIG. 6. Other target addresses, however, may correspond to a piggyback interrupt vector, such as one of piggyback interrupt vectors 650 shown in FIG. 6.

FIG. 7 shows an example of when a target address corresponds to a piggyback interrupt vector (target address A 320) or when a target address corresponds to an administrating interrupt vector (target address B 325). When the target address corresponds to a piggyback interrupt vector, piggyback interrupt vector processing commences at 705, whereupon the piggyback interrupt vector moves the current "processing state" from general purpose register 725 to scratch register 0 715 (step 710). The piggyback interrupt vector performs this step in order to subsequently use general purpose register 725 to store piggyback interrupt flag information (discussed below).

At step 720, the piggyback interrupt vector sets a piggyback interrupt flag in general purpose register 725 that identifies the piggyback interrupt vector. For example, if piggyback interrupt vector "7" is called, the piggyback interrupt vector may store "7" in general purpose register 725. At step 730, the piggyback interrupt vector moves the piggyback interrupt flag into scratch register 1 355. The piggyback interrupt vector then branches to the administrating interrupt vector (located at target address B 325) at step 740, and piggyback interrupt vector processing ends at 745.

As discussed previously, the embodiment shown in FIG. 7 assumes that the piggyback interrupt vector does not store information directly into scratch registers. As such, FIG. 7's embodiment shows a piggyback interrupt vector storing flag information into a general purpose register, and then moving the flag information into a scratch register. As those skilled in the art can appreciate, other embodiments may be utilized to store flag information directly to the scratch registers based upon a computer system's architecture.

When the piggyback interrupt vector branches to the administrating interrupt vector, or when operating system 310 or application 315 generates an interrupt whose target address is target address B 325, administrating interrupt vector processing commences at 750. At step 755, the administrating interrupt vector retrieves the piggyback interrupt flag information from scratch register 1 355. Scratch register 1 355 includes a piggyback interrupt flag when a piggyback interrupt vector is called (discussed above), but may not include a piggyback interrupt flag when the administrating interrupt vector is called directly by operating system 310 or application 315 (e.g., a value of "0").

A determination is made as to whether the piggyback interrupt flag is set (decision 760). If the piggyback interrupt flag is not set (indicating a direct call to the administrating interrupt vector), decision 760 branches to "No" branch 762, whereupon the administrating interrupt vector branches to administrating interrupt handler 380 at step 765 to process the interrupt, and administrating interrupt vector processing ends at 770.

On the other hand, if the piggyback interrupt flag is set, decision 760 branches to "Yes" branch 764, whereupon the administrating interrupt vector identifies a piggyback interrupt handler that corresponds to the piggyback interrupt flag (e.g., piggyback interrupt handler 7) at step 775. For example, the administrating interrupt vector may use a look-up table to identify a corresponding piggyback interrupt handler, or the administrating interrupt vector may include nested code to identify the corresponding piggyback interrupt handler, such as that shown in FIG. 5A.

At step 780, the administrating interrupt vector branches to the identified piggyback interrupt handler (piggyback interrupt handler 370), and administrating interrupt vector processing ends at 785.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    receiving, by a hypervisor, an interrupt that includes a target address;
    branching to an administrating interrupt vector;
    determining, by the administrating interrupt vector, whether to branch to a piggyback interrupt handler, the piggyback interrupt handler corresponding to a piggyback interrupt vector that is different than the administrating interrupt vector;
    branching to the piggyback interrupt handler in response to the administrating interrupt vector determining to branch to the piggyback interrupt handler; and
    branching to an administrating interrupt handler corresponding to the administrating interrupt vector in response to the administrating interrupt vector determining not to branch to the piggyback interrupt handler.

2. The method of claim 1 wherein the hypervisor is in real mode.

3. The method of claim 2 wherein the piggyback interrupt vector is located at a first real address that corresponds to the target address, the method further comprising:
    branching to the piggyback interrupt vector located at the first real address;
    setting, by the piggyback interrupt vector, a piggyback vector flag; and
    branching from the piggyback interrupt vector to the administrating interrupt vector located at a second real address, wherein the administrating interrupt vector utilizes the piggyback vector flag to determine whether to branch to the piggyback interrupt handler.

4. The method of claim 3 further comprising:
    setting the piggyback vector flag in a general purpose register; and
    moving the piggyback vector flag from the general purpose register to a scratch register.

5. The method of claim 2 wherein the administrating interrupt vector supports a plurality of piggyback vectors and a plurality of corresponding piggyback interrupt handlers.

6. The method of claim 5 further comprising:
    retrieving, by the administrating interrupt vector, a piggyback vector flag;
    selecting one of the plurality of piggyback interrupt handlers based upon the piggyback interrupt flag; and
    branching to the selected one of the plurality of piggyback interrupt handlers.

7. The method of claim 1 wherein the piggyback interrupt vector includes fewer bits than the administrating interrupt vector.

8. An information handling system comprising:
    one or more processors;
    a memory accessible by at least one of the processors;

a nonvolatile storage area accessible by at least one of the processors;

a set of instructions stored in the memory and executed by at least one of the processors in order to perform actions of:

receiving, by a hypervisor executing on one of the processors, an interrupt that includes a target address;

branching to an administrating interrupt vector;

determining, by the administrating interrupt vector, whether to branch to a piggyback interrupt handler, the piggyback interrupt handler corresponding to a piggyback interrupt vector that is different than the administrating interrupt vector;

branching to the piggyback interrupt handler in response to the administrating interrupt vector determining to branch to the piggyback interrupt handler; and branching to an administrating interrupt handler corresponding to the administrating interrupt vector in response to the administrating interrupt vector determining not to branch to the piggyback interrupt handler.

9. The information handling system of claim of claim 8 wherein the hypervisor is in real mode.

10. The information handling system of claim of claim 9 wherein the piggyback interrupt vector is located at a first real address that corresponds to the target address, the information handling system further performing actions that include:

branching to the piggyback interrupt vector located at the first real address;

setting, by the piggyback interrupt vector, a piggyback vector flag; and branching from the piggyback interrupt vector to the administrating interrupt vector located at a second real address, wherein the administrating interrupt vector utilizes the piggyback vector flag to determine whether to branch to the piggyback interrupt handler.

11. The information handling system of claim of claim 10 wherein the information handling system further performs actions that include:

setting the piggyback vector flag in a general purpose register; and moving the piggyback vector flag from the general purpose register to a scratch register.

12. The information handling system of claim of claim 9 wherein the administrating interrupt vector supports a plurality of piggyback vectors and a plurality of corresponding piggyback interrupt handlers.

13. The information handling system of claim of claim 12 wherein the information handling system further performs actions that include:

retrieving, by the administrating interrupt vector, a piggyback vector flag;

selecting one of the plurality of piggyback interrupt handlers based upon the piggyback interrupt flag; and branching to the selected one of the plurality of piggyback interrupt handlers.

14. The information handling system of claim of claim 8 wherein the piggyback interrupt vector includes fewer bits than the administrating interrupt vector.

15. A computer program product stored in a computer readable storage medium, comprising functional descriptive material that, when executed by an information handling system, causes the information handling system to perform actions that include:

receiving, by a hypervisor executing on one of the processors, an interrupt that includes a target address;

branching to an administrating interrupt vector;

determining, by the administrating interrupt vector, whether to branch to a piggyback interrupt handler, the piggyback interrupt handler corresponding to a piggyback interrupt vector that is different than the administrating interrupt vector;

branching to the piggyback interrupt handler in response to the administrating interrupt vector determining to branch to the piggyback interrupt handler; and branching to an administrating interrupt handler corresponding to the administrating interrupt vector in response to the administrating interrupt vector determining not to branch to the piggyback interrupt handler.

16. The computer program product of claim of claim 15 wherein the hypervisor is in real mode.

17. The computer program product of claim of claim 16 wherein the piggyback interrupt vector is located at a first real address that corresponds to the target address, the information handling system further performing actions that include:

branching to the piggyback interrupt vector located at the first real address;

setting, by the piggyback interrupt vector, a piggyback vector flag; and branching from the piggyback interrupt vector to the administrating interrupt vector located at a second real address, wherein the administrating interrupt vector utilizes the piggyback vector flag to determine whether to branch to the piggyback interrupt handler.

18. The computer program product of claim of claim 17 wherein the information handling system further performs actions that include:

setting the piggyback vector flag in a general purpose register; and moving the piggyback vector flag from the general purpose register to a scratch register.

19. The computer program product of claim of claim 16 wherein the administrating interrupt vector supports a plurality of piggyback vectors and a plurality of corresponding piggyback interrupt handlers.

20. The computer program product of claim of claim 19 wherein the information handling system further performs actions that include:

retrieving, by the administrating interrupt vector, a piggyback vector flag;

selecting one of the plurality of piggyback interrupt handlers based upon the piggyback interrupt flag; and branching to the selected one of the plurality of piggyback interrupt handlers.

21. The computer program product of claim of claim 15 wherein the piggyback interrupt vector includes fewer bits than the administrating interrupt vector.

* * * * *